US010764961B2

(12) United States Patent
Feng

(10) Patent No.: US 10,764,961 B2
(45) Date of Patent: Sep. 1, 2020

(54) RELAY TRANSMISSION METHOD AND DEVICE

(71) Applicant: GUANGDONG OPPO MOBILE TELECOMMUNICATIONS CORP., LTD., Dongguan, Guangdong (CN)

(72) Inventor: Bin Feng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 30 days.

(21) Appl. No.: 16/069,700

(22) PCT Filed: Mar. 30, 2016

(86) PCT No.: PCT/CN2016/077914
§ 371 (c)(1),
(2) Date: Jul. 12, 2018

(87) PCT Pub. No.: WO2017/166139
PCT Pub. Date: Oct. 5, 2017

(65) Prior Publication Data
US 2019/0029070 A1    Jan. 24, 2019

(51) Int. Cl.
*H04W 88/04* (2009.01)
*H04W 72/14* (2009.01)
(Continued)

(52) U.S. Cl.
CPC ............. *H04W 88/04* (2013.01); *H04W 4/70* (2018.02); *H04W 72/1278* (2013.01);
(Continued)

(58) Field of Classification Search
CPC ..... H04W 88/04; H04W 76/11; H04W 76/12; H04W 4/70; H04W 72/1278; H04W 72/14; H04W 80/02
See application file for complete search history.

(56) References Cited

U.S. PATENT DOCUMENTS 8,750,332 B2 * 6/2014 Agiwal ............... H04W 28/065
370/474
10,044,839 B2 * 8/2018 Lee ......................... H04L 69/22
(Continued)

FOREIGN PATENT DOCUMENTS

CN      101384020 A    3/2009
CN      101674153 A    3/2010
(Continued)

OTHER PUBLICATIONS

Supplementary European Search Report in European application No. 16895920.3, dated Nov. 27, 2018.
(Continued)

*Primary Examiner* — Jenee Holland
(74) *Attorney, Agent, or Firm* — Ladas & Parry LLP

(57) ABSTRACT

Disclosed in the present invention are a relay transmission method and device, enabling reduction of complexity of relay transmission and a decrease of transmission latency. The method comprises: a relay terminal apparatus receives a first lower-level data frame sent by a transmitting-end apparatus to a receiving-end apparatus, wherein the first lower-layer data frame is obtained by the transmitting-end apparatus by means of processing a MAC PDU carrying identifier information of a remote terminal apparatus; the relay terminal apparatus determines, at the lower layer, whether the first lower-layer data frame is required to be forwarded; and the relay terminal apparatus forwards, at the lower layer, the first lower-layer data frame, wherein the transmitting-end apparatus is the remote terminal apparatus, and the receiving-end apparatus is a network apparatus; alternatively, the transmitting-end apparatus is a network apparatus, and the receiving-end apparatus is the remote terminal apparatus.

19 Claims, 6 Drawing Sheets

(51) Int. Cl.
  *H04W 72/12* (2009.01)
  *H04W 76/11* (2018.01)
  *H04W 76/12* (2018.01)
  *H04W 4/70* (2018.01)
  *H04W 80/02* (2009.01)
  *H04W 28/02* (2009.01)
  *H04L 12/721* (2013.01)

(52) U.S. Cl.
  CPC ............ *H04W 72/14* (2013.01); *H04W 76/11* (2018.02); *H04W 76/12* (2018.02); *H04W 80/02* (2013.01)

(56) References Cited

U.S. PATENT DOCUMENTS

| | | | |
|---|---|---|---|
| 2002/0001296 A1* | 1/2002 | Lee ....................... | H04L 1/0066 370/338 |
| 2003/0081622 A1* | 5/2003 | Jeong ................. | H04L 12/5601 370/401 |
| 2004/0196822 A1* | 10/2004 | Proctor, Jr. .......... | H01Q 3/2605 370/349 |
| 2004/0199850 A1* | 10/2004 | Yi ......................... | H03M 13/09 714/758 |
| 2006/0003696 A1* | 1/2006 | Diaz Cervera ........ | H04B 7/155 455/11.1 |
| 2007/0104148 A1* | 5/2007 | Kang ....................... | H04W 4/08 370/331 |
| 2007/0127499 A1* | 6/2007 | Choi ........................ | H04L 12/56 370/395.52 |
| 2007/0280188 A1* | 12/2007 | Kang ..................... | H04B 7/155 370/338 |
| 2008/0089275 A1* | 4/2008 | Hart ....................... | H04B 7/155 370/328 |
| 2009/0011784 A1* | 1/2009 | Kang ................... | H04B 7/2606 455/517 |
| 2009/0180488 A1* | 7/2009 | Yang ....................... | H04L 12/66 370/401 |
| 2009/0232133 A1* | 9/2009 | Yu ........................... | H04J 3/047 370/389 |
| 2010/0302999 A1* | 12/2010 | Hui ......................... | H04B 7/155 370/315 |
| 2010/0309792 A1* | 12/2010 | Wang ..................... | H04B 7/155 370/246 |
| 2011/0194485 A1* | 8/2011 | Horneman .......... | H04W 72/042 370/315 |
| 2012/0008547 A1* | 1/2012 | Yokoyama ............. | H04B 7/155 370/315 |
| 2012/0057521 A1* | 3/2012 | Liang .................... | H04L 1/1887 370/315 |
| 2012/0120865 A1* | 5/2012 | Liang ................. | H04B 7/15542 370/315 |
| 2013/0235745 A1* | 9/2013 | Zhang ................... | H04W 72/08 370/252 |
| 2013/0272199 A1* | 10/2013 | Agiwal ................. | H04L 1/1867 370/328 |
| 2014/0161024 A1 | 6/2014 | Speight | |
| 2014/0177514 A1 | 6/2014 | Azizi | |
| 2014/0204835 A1 | 7/2014 | Speight | |
| 2014/0226558 A1 | 8/2014 | Speight | |
| 2014/0233453 A1* | 8/2014 | Speight ............. | H04W 72/0413 370/315 |
| 2015/0223232 A1 | 8/2015 | Eriksson | |
| 2015/0341937 A1 | 11/2015 | Speight et al. | |
| 2016/0198467 A1* | 7/2016 | Takahashi ......... | H04W 72/0453 370/329 |
| 2016/0269234 A1 | 9/2016 | Zheng | |
| 2016/0337936 A1 | 11/2016 | Li et al. | |
| 2016/0338092 A1* | 11/2016 | Agiwal ............. | H04W 72/1289 |
| 2017/0055252 A1 | 2/2017 | Speight et al. | |
| 2017/0135112 A1 | 5/2017 | Speight et al. | |
| 2017/0331577 A1* | 11/2017 | Parkvall ................ | H04B 7/0452 |
| 2019/0020744 A1* | 1/2019 | Dong ..................... | H04L 69/22 |

FOREIGN PATENT DOCUMENTS

| | | |
|---|---|---|
| CN | 101765229 A | 6/2010 |
| CN | 104429156 A | 3/2015 |
| CN | 104601352 A | 5/2015 |
| JP | 2012523197 A | 9/2012 |
| JP | 2014506758 A | 3/2014 |
| JP | 2014526214 A | 10/2014 |
| JP | 2016535509 A | 11/2016 |
| WO | 2015065085 A1 | 5/2015 |
| WO | 2015108373 A1 | 7/2015 |
| WO | 2015128537 A1 | 9/2015 |

OTHER PUBLICATIONS

English Translation of the Written Opinion of the international Search Authority in international application No. PCT/CN2016/077914, dated Nov. 29, 2016.

International Search Report in international application No. PCT/CN2016/077914, dated Nov. 29, 2016.

The Written Opinion of the International Search Authority in international application No. PCT/CN2016/077914, dated Nov. 29, 2016.

ZTE, Backhaul link Packet Aggregated Transmission. TSG-RAN WG1 #58 R1-093202, Aug. 19, 2009.

First Office Action of the Japanese application No. 2018-538556, dated Jan. 17, 2020.

Office Action in Indian application No. 201817032896, dated May 27, 2020.

First Office Action in Chinese application No. 201680079729.X, dated Apr. 24, 2020.

Notice of Allowance in Japanese application No. 2018-538556, dated Jun. 5, 2020.

* cited by examiner

RELAY TRANSMISSION METHOD AND DEVICE

RELATED APPLICATION

This application is an application under 35 U.S.C. 371 of International Application No. PCT/CN2016/077914 filed on Mar. 30, 2016, the entire contents of which are incorporated herein by reference.

TECHNICAL FIELD

Embodiments of the present disclosure relate to the field of communications, and more particularly to a relay transmission method and device.

BACKGROUND

A Device-to-Device (D2D) technology refers to that neighboring terminal equipments may perform data transmission in a direct link manner in a short-distance range and a network equipment for forwarding is not required. A licensed frequency band resource may be shared between D2D communication and a cellular system to form a unified hybrid cellular-D2D network. In the hybrid network, part of terminal equipment may still work in a cellular communication mode, namely communicating with other terminal equipment through network equipment, while part of terminal equipment may work in a D2D communication mode, namely performing direct data transmission with the other terminal equipment through D2D links with the other terminal equipment.

In addition, data transmission between network equipment and terminal equipment may be assisted through a D2D relay, and at this moment, a D2D communication mode is adopted between the D2D relay and a D2D terminal, while a cellular communication mode is used between the D2D relay and the network equipment. The D2D relay receives and forwards data in a half duplex manner, and performs mode switching in a receiving and forwarding process.

In a conventional art, a D2D relay relays data transmission between a D2D terminal and network equipment through an Internet Protocol (IP) layer (i.e., Layer 3 (L3)), and for a received data packet, is required to perform de-capsulation processing sequentially through Layer 1 (L1) (i.e., a Physical (PHY) layer), Layer 2 (L2) (including a Media Access Control (MAC) layer, a Radio Link Control (RLC) layer and a Packet Data Convergence Protocol (PDCP) layer) and L3 and perform encapsulation processing sequentially through L3, L2 and L1 to implement data relaying. Therefore, complexity is relatively high, and a data processing delay is relatively long.

SUMMARY

The embodiments of the present disclosure provide a relay transmission method and device, which may reduce relay transmission complexity and reduce a data delay.

A first aspect provides a relay transmission method, which may include that: relay terminal equipment receives a first bottom-layer data frame which is intended to be sent to a receiver equipment by a sender equipment, wherein the first bottom-layer data frame may be obtained by the sender equipment by processing through a bottom layer, a MAC Protocol Data Unit (PDU) containing identification information of a remote terminal equipment; the relay terminal equipment determines that the first bottom-layer data frame is required to be forwarded in the bottom layer; and the relay terminal equipment performs forwarding processing on the first bottom-layer data frame in the bottom layer, wherein the sender equipment may be the remote terminal equipment and the receiver equipment may be network equipment, or the sender equipment may be the network equipment and the receiver equipment may be the remote terminal equipment.

Optionally, the relay terminal equipment may only process the received first bottom-layer data frame through the bottom layer. In such case, the relay terminal equipment may perform forwarding processing on the first bottom-layer data frame under the condition of not identifying the remote terminal equipment corresponding to the first bottom-layer data frame.

Optionally, the relay terminal equipment may adopt a transmission resource for relay transmission to forward data contained in the first bottom-layer data frame.

Optionally, when the sender equipment is the network equipment, the relay terminal equipment may broadcast the data contained in the first bottom-layer data frame.

According to the relay transmission method provided by the embodiment of the present disclosure, the relay terminal equipment relays the data between the remote terminal equipment and the network equipment in a bottom-layer relay manner, wherein the remote terminal equipment or the network equipment sends the bottom-layer data frame to the relay terminal equipment, and the relay terminal equipment does not identify the remote terminal equipment in the bottom layer and, when determining that the received data frame contains relay data, performs relay forwarding processing on the data frame through the bottom layer. Compared with an L3 relay manner adopted by the relay terminal equipment in the conventional art, such a manner may reduce processing complexity of the relay terminal equipment, reduce a transmission delay of the relay data and improve overall system performance.

In a first possible implementation mode of the first aspect, when the sender equipment is the network equipment, before the relay terminal equipment receives the first bottom-layer data frame which is intended to be sent to the receiver equipment by the sender equipment, the method may further include that: the relay terminal equipment performs addressing through a relay-specific Radio Network Temporary Identity (RNTI); and the operation that the relay terminal equipment determines that the first bottom-layer data frame is required to be forwarded may include that: if the first bottom-layer data frame is received by the relay terminal equipment by addressing, the relay terminal equipment determines that the first bottom-layer data frame is required to be forwarded.

In combination with the abovementioned possible implementation mode, in a second possible implementation mode of the first aspect, the first bottom-layer data frame may be sent by the sender equipment by adopting a transmission resource for relay transmission; and the operation that the relay terminal equipment determines that the first bottom-layer data frame is required to be forwarded may include that: the relay terminal equipment determines that the first bottom-layer data frame is required to be forwarded according to the transmission resource occupied by the first bottom-layer data frame.

In combination with the abovementioned possible implementation modes, in a third possible implementation mode of the first aspect, the identification information of the remote terminal equipment may include an L2 identifier of the remote terminal equipment or a terminal equipment identifier of the remote terminal equipment.

In combination with the abovementioned possible implementation modes, in a fourth possible implementation mode of the first aspect, a bottom layer of the network equipment may specifically be a PHY layer, and a bottom layer of the remote terminal equipment may correspond to a D2D communication technology adopted between the remote terminal equipment and the relay terminal equipment.

In combination with the abovementioned possible implementation modes, in a fifth possible implementation mode of the first aspect, the identification information of the remote terminal equipment may be born in a MAC Control Element (CE) field of the MAC PDU.

In combination with the abovementioned possible implementation modes, in a sixth possible implementation mode of the first aspect, when the sender equipment is the remote terminal equipment and the receiver equipment is the network equipment, before the operation that the relay terminal equipment performs forwarding processing on the first bottom-layer data frame in the bottom layer, the method may further include that: the relay terminal equipment determines a Physical Uplink Control Channel (PUCCH) resource corresponding to a data volume contained in the first bottom-layer data frame in the bottom layer according to correspondences between PUCCH resources and data volumes or correspondences between PUCCH resources and data volume ranges; and the relay terminal equipment adopts the PUCCH resource to send a scheduling request to the network equipment.

In combination with the abovementioned possible implementation modes, in a seventh possible implementation mode of the first aspect, when the sender equipment is the remote terminal equipment and the receiver equipment is the network equipment, before the operation that the relay terminal equipment performs forwarding processing on the first bottom-layer data frame in the bottom layer, the method may further include that: the relay terminal equipment determines a preamble corresponding to the data volume contained in the first bottom-layer data frame in the bottom layer according to correspondences between preambles and data volumes or correspondences between preambles and data volume ranges; and the relay terminal equipment sends the preamble to the network equipment, the preamble being configured for the network equipment to allocate an uplink transmission resource to the relay terminal equipment.

In combination with the abovementioned possible implementation modes, in an eighth possible implementation mode of the first aspect, the operation that the relay terminal equipment performs forwarding processing on the first bottom-layer data frame in the bottom layer may include that: the relay terminal equipment performs decoding processing on the first bottom-layer data frame to obtain data contained in the first bottom-layer data frame; the relay terminal equipment performs coding processing on the data to obtain a second bottom-layer data frame; and the relay terminal equipment sends the second bottom-layer data frame.

In combination with the abovementioned possible implementation modes, in a ninth possible implementation mode of the first aspect, the operation that the relay terminal equipment performs forwarding processing on the first bottom-layer data frame in the bottom layer may include that: the relay terminal equipment directly sends the first bottom-layer data frame through the bottom layer.

A second aspect provides another relay transmission method, which may include that: sender equipment generates a MAC PDU, wherein the MAC PDU may contain identification information of a remote terminal equipment; and the sender equipment sends a first bottom-layer data frame, which is obtained by processing the MAC PDU through a bottom layer, to a relay terminal equipment, wherein the sender equipment may be the remote terminal equipment or the sender equipment may be network equipment.

In a first possible implementation mode of the second aspect, when the sender equipment is the network equipment, before the operation that the sender equipment sends the first bottom-layer data frame to the relay terminal equipment, the method may further include that: the network equipment sends a Physical Downlink Control Channel (PDCCH) to the relay terminal equipment, wherein the PDCCH may be configured to schedule the first bottom-layer data frame, and the PDCCH may be scrambled by adopting a relay-specific RNTI.

In combination with the abovementioned possible implementation mode, in a second possible implementation mode of the second aspect, the operation that the sender equipment sends the first bottom-layer data frame to the relay terminal equipment may include that: the sender equipment adopts a transmission resource for relay transmission to send the first bottom-layer data frame to the relay terminal equipment.

In combination with the abovementioned possible implementation modes, in a third possible implementation mode of the second aspect, the identification information of the remote terminal equipment may include an L2 identifier of the remote terminal equipment or a terminal equipment identifier of the remote terminal equipment.

In combination with the abovementioned possible implementation modes, in a fourth possible implementation mode of the second aspect, a bottom layer of the network equipment may specifically be a PHY layer, and a bottom layer of the remote terminal equipment may correspond to a D2D communication technology adopted between the remote terminal equipment and the relay terminal equipment.

In combination with the abovementioned possible implementation modes, in a fifth possible implementation mode of the second aspect, the identification information of the remote terminal equipment may be born in a MAC CE field of the MAC PDU.

A third aspect provides another relay transmission method, which may include that: receiver equipment receives a second bottom-layer data frame sent by a relay terminal equipment, wherein the second bottom-layer data frame may be obtained by processing a MAC PDU containing identification information of a remote terminal equipment through a bottom layer; and the receiver equipment determines that the second bottom-layer data frame corresponds to the remote terminal equipment in a higher layer according to the identification information of the remote terminal equipment, wherein the receiver equipment may be network equipment or the receiver equipment may be the remote terminal equipment.

Wherein, the higher layer may specifically be a layer higher than the bottom layer in a user-plane protocol stack, for example, a MAC layer, RLC layer or PDCP layer in L2.

In a first possible implementation mode of the third aspect, the operation that the receiver equipment receives the second bottom-layer data frame sent by the relay terminal equipment may include that: the receiver equipment receives the second bottom-layer data frame sent by the relay terminal equipment by adopting a transmission resource for relay transmission; and the method may further include that: the receiver equipment determines that the second bottom-layer data frame has been forwarded by the relay terminal equipment according to the transmission resource occupied by the second bottom-layer data frame.

In combination with the abovementioned possible implementation mode, in a second possible implementation mode of the third aspect, the method may further include that: when the receiver equipment is the network equipment, the network equipment determines a data transmission tunnel corresponding to the remote terminal equipment; and the network equipment sends data contained in the second bottom-layer data frame to a core network equipment through the corresponding data transmission tunnel.

In combination with the abovementioned possible implementation modes, in a third possible implementation mode of the third aspect, the identification information of the remote terminal equipment may include an L2 identifier of the remote terminal equipment or a terminal equipment identifier of the remote terminal equipment.

In combination with the abovementioned possible implementation modes, in a fourth possible implementation mode of the third aspect, a bottom layer of the network equipment may specifically be a PHY layer, and a bottom layer of the remote terminal equipment may correspond to a D2D communication technology adopted between the remote terminal equipment and the relay terminal equipment.

In combination with the abovementioned possible implementation modes, in a fifth possible implementation mode of the third aspect, the identification information of the remote terminal equipment may be born in a MAC CE field of the MAC PDU.

In combination with the abovementioned possible implementation modes, in a sixth possible implementation mode of the third aspect, when the receiver equipment is the network equipment, before the operation that the receiver equipment receives the second bottom-layer data frame sent by the relay terminal equipment, the method may further include that: the network equipment receives a scheduling request sent by the relay terminal equipment; the network equipment determines a data volume or data volume range corresponding to a PUCCH resource occupied by the scheduling request according to correspondences between PUCCH resources and data volumes or correspondences between PUCCH resources and data volume ranges; and the network equipment allocates an uplink transmission resource to the relay terminal equipment according to the data volume or data volume range.

In combination with the abovementioned possible implementation modes, in a seventh possible implementation mode of the third aspect, when the receiver equipment is the network equipment, before the operation that the receiver equipment receives the second bottom-layer data frame sent by the relay terminal equipment, the method may further include that: the network equipment receives a preamble sent by the relay terminal equipment; the network equipment determines a data volume or data volume range corresponding to the received preamble according to correspondences between preambles and data volumes or correspondences between preambles and data volume ranges; and the network equipment allocates the uplink transmission resource to the relay terminal equipment according to the data volume or data volume range.

In such a manner, the network equipment may allocate the uplink transmission resource according to the received preamble or the PUCCH resource occupied by the scheduling request, and the relay terminal equipment is not required to contain a buffer report configured to indicate a magnitude of the data volume when requesting for an uplink grant, so that a signaling overhead is reduced.

A fourth aspect provides a device for relay transmission, which is configured to execute the method in the first aspect or any possible implementation mode of the first aspect. Specifically, the device includes units configured to execute the method in the first aspect or any possible implementation mode of the first aspect.

A fifth aspect provides another device for relay transmission, which is configured to execute the method in the second aspect or any possible implementation mode of the second aspect. Specifically, the device includes units configured to execute the method in the second aspect or any possible implementation mode of the second aspect.

A sixth aspect provides another device for relay transmission, which is configured to execute the method in the third aspect or any possible implementation mode of the third aspect. Specifically, the device includes units configured to execute the method in the third aspect or any possible implementation mode of the third aspect.

A seventh aspect provides another device for relay transmission, which includes a storage unit and a processor, wherein the storage unit is configured to store an instruction, the processor is configured to execute the instruction stored in a memory, and when the processor executes the instruction stored in the memory, such execution enables the processor to execute the method in the first aspect or any possible implementation mode of the first aspect.

An eighth aspect provides another device for relay transmission, which includes a storage unit and a processor, wherein the storage unit is configured to store an instruction, the processor is configured to execute the instruction stored in a memory, and when the processor executes the instruction stored in the memory, such execution enables the processor to execute the method in the second aspect or any possible implementation mode of the second aspect.

A ninth aspect provides another device for relay transmission, which includes a storage unit and a processor, wherein the storage unit is configured to store an instruction, the processor is configured to execute the instruction stored in a memory, and when the processor executes the instruction stored in the memory, such execution enables the processor to execute the method in the third aspect or any possible implementation mode of the third aspect.

A tenth aspect provides a computer-readable medium, which is configured to store a computer program, the computer program including an instruction configured to execute the method in the first aspect or any possible implementation mode of the first aspect.

An eleventh aspect provides another computer-readable medium, which is configured to store a computer program, the computer program including an instruction configured to execute the method in the second aspect or any possible implementation mode of the second aspect.

A twelfth aspect provides another computer-readable medium, which is configured to store a computer program, the computer program including an instruction configured to execute the method in the third aspect or any possible implementation mode of the third aspect.

A thirteenth aspect provides a relay transmission system, which includes relay terminal equipment, remote terminal equipment and network equipment, wherein a user-plane protocol stack of the relay terminal equipment may include a bottom layer (which may also be called as L1), a user-plane protocol stack of the remote terminal equipment may include L1, L2 and L3, and a user-plane protocol stack of the network equipment may include L1, L2 and L3, wherein L1 of the relay terminal equipment is an equivalent layer of L1 of the remote terminal equipment and L1 of the network equipment, and L2 of the remote terminal equipment is an equivalent layer of L2 of the network equipment.

Optionally, the user-plane protocol stack of the relay terminal equipment may only include L1 and does not include a higher layer (for example, L2 and L3). Optionally, the relay terminal equipment performs relay transmission through L1, and may not identify the remote terminal equipment corresponding to a data frame to be relayed. In such case, the network equipment and the remote terminal equipment may identify the remote terminal equipment corresponding to the data frame through higher layers.

Optionally, the relay terminal equipment may be the device in the fourth aspect or any possible implementation mode of the fourth aspect, sender equipment in the remote terminal equipment and the network equipment may be the device in the fifth aspect or any possible implementation mode of the fifth aspect, and receiver equipment in the remote terminal equipment and the network equipment may be the device in the sixth aspect or any possible implementation mode of the sixth aspect.

Optionally, the relay terminal equipment may be the device in the seventh aspect or any possible implementation mode of the seventh aspect, the sender equipment in the remote terminal equipment and the network equipment may be the device in the eighth aspect or any possible implementation mode of the eighth aspect, and the receiver equipment in the remote terminal equipment and the network equipment may be the device in the ninth aspect or any possible implementation mode of the ninth aspect.

BRIEF DESCRIPTION OF DRAWINGS

In order to describe the technical solutions of the embodiments of the present disclosure more clearly, the drawings required to be used in descriptions about the embodiments of the present disclosure or the conventional art will be simply introduced below. It is apparent that the drawings described below are only some embodiments of the present disclosure. Other drawings may further be obtained by those of ordinary skilled in the art according to these drawings without creative work.

DETAILED DESCRIPTION

The technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skilled in the art on the basis of the embodiments in the present disclosure without creative work shall fall within the scope of protection of the present disclosure.

It is to be understood that terms "system" and "network" in the present disclosure may usually be exchanged for use in the present disclosure. Term "and/or" in the present disclosure is only an association relationship describing associated objects and represents that three relationships may exist. For example, A and/or B may represent three conditions, i.e., independent existence of A, coexistence of A and B and independent existence of B. In addition, character "/" in the present disclosure usually represents that previous and next associated objects form an "or" relationship.

Figure 1:
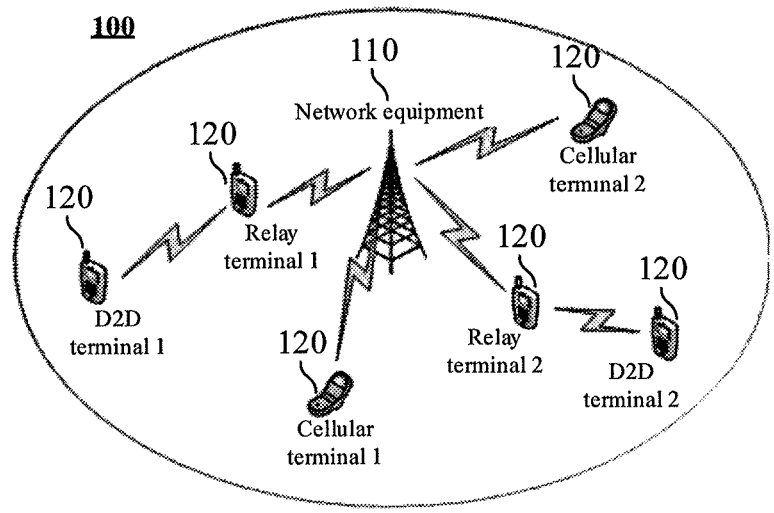
FIG. 1 is a schematic flowchart of a wireless communication system to which embodiments of the present disclosure are applied.

FIG. 1 is a schematic diagram of a wireless communication system 100 to which embodiments of the present disclosure are applied. The wireless communication system 100 may include at least one network equipment 110. The network equipment 110 may be equipment communicating with terminal equipment. Each network equipment 110 may provide communication coverage for a specific geographic region and may communicate with terminal equipment located in the coverage. The network equipment 110 may be a Base Transceiver Station (BTS) in a Global System for Mobile communications (GSM) or a Code Division Multiple Access (CDMA) system, may also be a NodeB (NB) in a Wideband Code Division Multiple Access (WCDMA) system, and may further be an Evolutional Node B (eNB or eNodeB) in a Long Term Evolution (LTE) system, or a radio controller in a Cloud Radio Access Network (CRAN), or the network equipment may be a relay station, an access point, vehicle-mounted equipment, wearable equipment, network-side equipment in a future 5th-Generation (5G) network, network equipment in a future evolved Public Land Mobile Network (PLMN) and the like.

The wireless communication system 100 further includes multiple terminal equipments 120 located in the coverage of the network equipment 110. The terminal equipment 120 may be mobile or fixed. The terminal equipment 120 may refer to an access terminal, User Equipment (UE), a user unit, a user station, a mobile station, a mobile radio station, a remote station, a remote terminal, mobile equipment, a user terminal, a terminal, wireless communication equipment, a user agent or a user device. The access terminal may be a cell phone, a cordless phone, a Session Initiation Protocol (SIP) phone, a Wireless Local Loop (WLL) station, a Personal Digital Assistant (PDA), handheld equipment with a wireless communication function, computing equipment or other processing equipment connected to a wireless modem, vehicle-mounted equipment, wearable equipment, terminal equipment in the future 5G network, terminal equipment in the future evolved PLMN and the like.

FIG. 1 exemplarily shows one network equipment and six terminal equipments. Optionally, the wireless communication system 100 may include multiple network equipments and other numbers of terminal equipment may be included in coverage of each network equipment. There are no limits made in the embodiment of the present disclosure. In addition, the wireless communication system 100 may further include another network entity such as a Mobile Management Entity (MME), a Serving Gateway (S-GW) and a Packet Data Network Gateway (P-GW), but the embodiment of the present disclosure is not limited thereto.

Specifically, the terminal equipment 120 may perform communication in a cellular communication mode or a D2D communication mode. Here, in the cellular communication mode, the terminal equipment may communicate with the other terminal equipment through the network equipment; and in the D2D communication mode, the terminal equipment may directly communicate with the other terminal equipment through a D2D link.

The multiple terminal equipments 120 shown in FIG. 1 include cellular terminal equipment, D2D terminal equipment and relay terminal equipment. Here, the cellular terminal equipment adopts a cellular communication technology to communicate with the network equipment 110, and the D2D terminal equipment implements data transmission with the network equipment through the relay terminal equipment. Here, between the relay terminal equipment and the D2D terminal equipment, there is a PC5 interface and a D2D communication technology is adopted for communication. Here, the D2D communication technology may specifically be a SideLink (SL) technology in LTE and may also be a technology such as Wireless Fidelity (WIFI) or Bluetooth in WLAN or another D2D communication technology, which is not limited thereto in the embodiment of the present disclosure; and between the relay terminal equipment and the network equipment, there is a Uu interface and the cellular communication technology is adopted for communication.

In the conventional art, the relay terminal equipment adopts an L3 relay manner for relaying, data processing complexity is relatively high, and a processing delay is relatively long. In the embodiment of the present disclosure, the relay terminal equipment may adopt a bottom-layer relay manner to relay data transmission between the network equipment and the D2D terminal equipment. Here, for an LTE system, a bottom layer of the network equipment refers to L1, i.e., a PHY layer, and a bottom layer of the D2D terminal equipment depends on a D2D communication technology adopted for the D2D terminal equipment and the relay terminal equipment. For example, if the D2D communication technology is the SL technology of LTE, the bottom layer may specifically be a PHY layer, and if the D2D communication technology is a Wireless Local Area Network (WLAN) or other communication technology, the bottom layer may specifically have another name. The embodiment of the present disclosure is not limited thereto.

Figure 2:
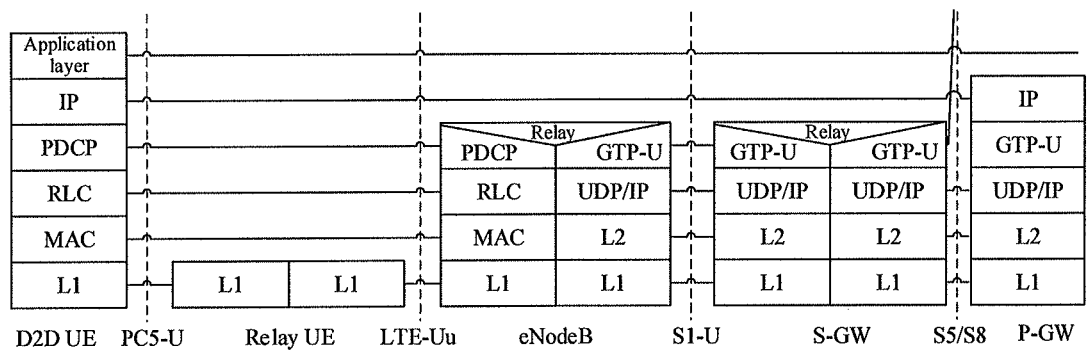
FIG. 2 is a schematic diagram of an example of a user-plane protocol stack, configured for relay communication, of each equipment according to an embodiment of the present disclosure.

In the embodiment of the present disclosure, data transmission on both of the Uu interface and the PC5 interface may be implemented through the PHY layer. Optionally, when the network equipment or the remote terminal equipment is required to send data to each other, the data to be sent may be encapsulated into a MAC PDU, for example, a MAC PDU, at first, then the MAC PDU is processed through the bottom layer to obtain a bottom-layer data frame, and the bottom-layer data frame is sent to the relay terminal equipment. FIG. 2 schematically shows an example of a user-plane protocol stack, configured for relay transmission, of each equipment. Here, a user-plane protocol stack, configured for relay transmission, of the relay terminal equipment may only include L1 (i.e., a PHY layer), and a user-plane protocol stack of each of the remote terminal equipment and the network equipment may include L1, L2 and L3. L1 of the relay terminal equipment may be an equivalent layer of L1 of the remote terminal equipment and L1 of the network equipment. And L2 of the remote terminal equipment may be an equivalent layer of L2 of the network equipment. In such case, the relay terminal equipment may optionally not identify the remote terminal equipment corresponding to the received bottom-layer data frame, while the remote terminal equipment and the network equipment identify the remote terminal equipment corresponding to the received data frame in higher layers (for example, MAC layers or higher layers). However, there are no limits made in the embodiment of the present disclosure.

For convenient description, descriptions will be made in the following embodiments mainly with the condition that the bottom layer is specifically the PHY layer as an example. However, those skilled in the art should know that, if the D2D communication technology adopted between the D2D terminal equipment (which may also be called as remote terminal equipment) and the relay terminal equipment is the other communication technology, the bottom layer may specifically have the other name. There are no limits made in the embodiment of the present disclosure.

Figure 3:
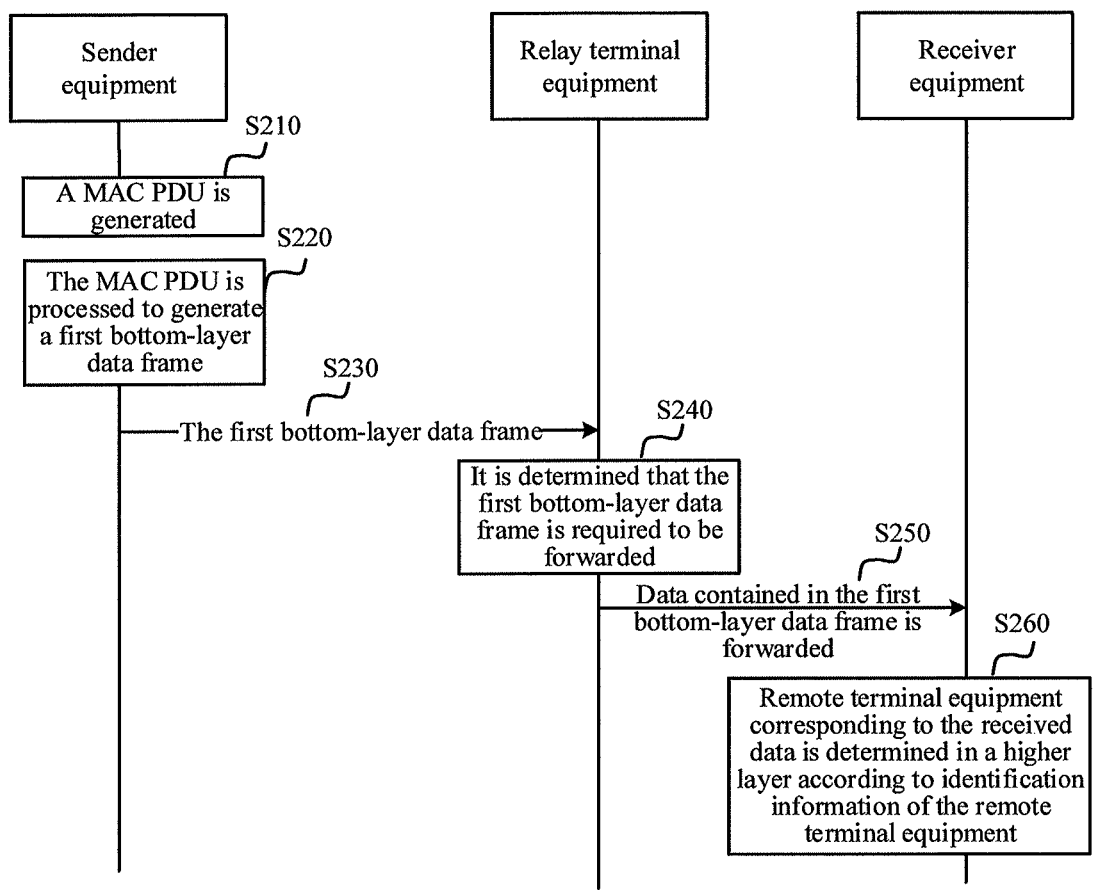
FIG. 3 is a schematic flowchart of a relay transmission method according to an embodiment of the present disclosure.

FIG. 3 schematically shows a relay transmission method 200 according to an embodiment of the present disclosure. The method 200 may be applied to the abovementioned wireless communication system 100, but the embodiment of the present disclosure is not limited thereto. Specifically, the method 200 may be applied to relay transmission of uplink data, that is, remote terminal equipment transmits the uplink data to network equipment through relay terminal equipment. In such case, sender equipment is specifically the remote terminal equipment (which may also be called as D2D terminal equipment) and receiver equipment is specifically the network equipment. Optionally, the method 200 may also be applied to relay transmission of downlink data, that is, the network equipment transmits the downlink data to the remote terminal equipment through the relay terminal equipment. In such case, the sender equipment is the network equipment and the receiver equipment is the remote terminal equipment. However, there are no limits made in the embodiment of the present disclosure.

In S210, the sender equipment generates a MAC PDU, the MAC PDU containing identification information of the remote terminal equipment.

When determining that data is required to be sent to the receiver equipment, the sender equipment may perform encapsulation processing on the data in a higher layer to obtain the MAC PDU. Here, the MAC PDU may contain the identification information of the remote terminal equipment. The identification information of the remote terminal equipment may be configured to identify the remote terminal equipment.

Optionally, the identification information of the remote terminal equipment may include a terminal equipment identifier of the remote terminal equipment. The terminal equipment identifier may be configured to uniquely identify the remote terminal equipment. The terminal equipment identifier may be predefined. For example, the terminal equipment identifier may specifically be an equipment identifier of the remote terminal equipment, a user identifier of the remote terminal equipment or the like. Optionally, the identification information of the remote terminal equipment may further include a specific identifier of the remote terminal equipment, and the specific identifier of the remote terminal equipment is configured to uniquely identify the remote terminal equipment during relay transmission. The specific identifier may be predefined and may also be configured by the network equipment. A length of the specific identifier may be smaller than a length of the terminal equipment identifier, so that a signaling overhead is reduced. The remote terminal equipment and the network equipment may identify the specific identifier in the higher layer. Here, the higher layer may refer to a layer located above the bottom layer, for example, L2 or L3, and there are no limits made in the embodiment of the present disclosure. For example, the specific identifier may be an L2 identifier. The L2 identifier may be an identifier encapsulated and parsed in L2, and for example, is identified in a MAC layer, an RLC layer or a PDCP layer. Optionally, the L2 identifier may be predefined or allocated to the remote terminal equipment by the network equipment. For example, the L2 identifier is allocated to the remote terminal equipment by the network equipment in a process of establishing a bearer for the remote terminal equipment.

Figure 4:
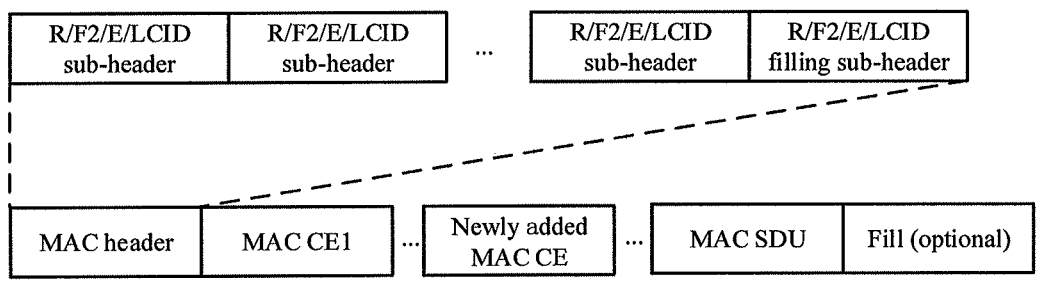
FIG. 4 is a schematic diagram of an example of a MAC PDU structure in a relay transmission method according to an embodiment of the present disclosure.

The identification information of the remote terminal equipment may be born at any possible position of the MAC PDU. Optionally, the identification information of the remote terminal equipment may be born in a MAC CE of the MAC PDU, and the MAC CE may be an existing MAC CE or an additional MAC CE, for example, as shown in FIG. 4. However, there are no limits made in the embodiment of the present disclosure.

In S220, the sender equipment processes the MAC PDU through a bottom layer (for example, a PHY layer) to generate a first bottom-layer data frame.

The sender equipment may transmit the MAC PDU to the bottom for processing and send the processed MAC PDU to the relay terminal equipment through the bottom layer. Optionally, the sender equipment may set the first bottom-layer data frame to enable the relay terminal equipment to determine that the first bottom-layer data frame contains relay data and is required to be forwarded. Alternatively, the sender equipment may adopt a transmission resource for relay transmission or another manner to send the first bottom-layer data frame to enable the relay terminal equipment to determine that the first bottom-layer data frame contains the relay data according to the transmission resource. There are no limits made in the embodiment of the present disclosure. For example, the network equipment configures the transmission resource for relay transmission to the relay terminal equipment. In such case, when the network equipment is required to send data to the remote terminal equipment, the transmission resource for relay transmission may be adopted to send the data to the relay terminal equipment. Alternatively, the network equipment configures the transmission resource for relay transmission to the remote terminal equipment. In such case, when the remote terminal equipment is required to send data to the network equipment, the transmission resource for relay transmission may be adopted to send the data to the relay terminal equipment. However, the embodiment of the present disclosure is not limited thereto.

In S230, the sender equipment sends the first bottom-layer data frame to the relay terminal equipment.

In S240, after receiving the first bottom-layer data frame sent by the sender equipment through the bottom layer, the relay terminal equipment may determine that the first bottom-layer data frame is required to be forwarded in the bottom layer.

Optionally, if the first bottom-layer data frame is sent by the sender equipment by adopting the transmission resource for relay transmission, the relay terminal equipment may determine that the first bottom-layer data frame contains the relay data and is required to be forwarded in the bottom layer according to the transmission resource occupied by the first bottom-layer data frame.

Optionally, the relay terminal equipment may adopt a relay-specific RNTI for addressing. Here, the relay-specific RNTI corresponds to relay transmission. Optionally, the relay-specific RNTI may be predefined or pre-allocated by the network equipment, which is not limited thereto in the embodiment of the present disclosure. If the relay terminal equipment receives a PDCCH configured to schedule the first bottom-layer data frame by adopting the relay-specific RNTI for addressing, that is, the PDCCH configured to schedule the first bottom-layer data frame is scrambled by adopting the relay-specific RNTI, the relay terminal equipment may determine that the first bottom-layer data frame contains the relay data and is required to be forwarded according to the relay-specific RNTI. However, the embodiment of the present disclosure is not limited thereto.

Optionally, the relay terminal equipment may further determine that the received bottom-layer data frame is sent to it or is required to be relayed and forwarded in another manner, which is not limited thereto in the embodiment of the present disclosure.

In S250, the relay terminal equipment performs forwarding processing on the first bottom-layer data frame in the bottom layer.

When the relay terminal equipment determines that the first bottom-layer data frame contains the relay data and is required to be relayed and forwarded, the relay terminal equipment may optionally not perform decoding processing on the first bottom-layer data frame, and instead, directly sends the first bottom-layer data frame through the bottom layer. Alternatively, the relay terminal equipment may perform decoding processing on the first bottom-layer data frame in the bottom layer to obtain data contained in the first bottom-layer data frame and send the data contained in the first bottom-layer data frame through the bottom layer. Specifically, the relay terminal equipment may perform coding processing on the data obtained by decoding processing to obtain a second bottom-layer data frame and send the second bottom-layer data frame through the bottom layer. However, the embodiment of the present disclosure is not limited thereto.

Optionally, if the receiver equipment is the remote terminal equipment, the relay terminal equipment does not identify the remote terminal equipment corresponding to the data contained in the first bottom-layer data frame. Optionally, the relay terminal equipment may send the data contained in the first bottom-layer data frame (which may specifically be the first bottom-layer data frame or the second bottom-layer data frame) in a broadcast form. For example, the relay terminal equipment may send the data contained in the first bottom-layer data frame through the transmission resource for relay transmission. However, the embodiment of the present disclosure is not limited thereto.

Optionally, when the receiver equipment is the network equipment, the relay terminal equipment may send the data contained in the first bottom-layer data frame to the network equipment. Here, the relay terminal equipment may optionally send the first bottom-layer data frame or the second bottom-layer data frame to the network equipment through the transmission resource for relay transmission. However, the embodiment of the present disclosure is not limited thereto.

Optionally, before sending the first bottom-layer data frame or the second bottom-layer data frame to the network equipment, the relay terminal equipment may further initiate an uplink grant request flow to request for an uplink transmission resource and adopt the uplink transmission resource allocated by the network equipment to send the first bottom-layer data frame or the second bottom-layer data frame to the network equipment. Here, the relay terminal equipment may optionally determine a data volume contained in the first bottom-layer data frame. For example, the relay terminal equipment may perform decoding processing on the first bottom-layer data frame in the bottom layer to obtain the data volume contained in the first bottom-layer data frame. Alternatively, the first bottom-layer data frame may contain indication information configured to indicate the data volume contained in the first bottom-layer data frame. A manner in which the relay terminal equipment determines the data volume contained in the first bottom-layer data frame is not limited thereto in the embodiment of the present disclosure.

Optionally, the relay terminal equipment may initiate an uplink grant request according to the data volume contained in the first bottom-layer data frame. As an optional embodiment, a corresponding relationship may exist between a PUCCH resource and a preset data volume or a preset data volume range. Here, the corresponding relationship may be predefined or preconfigured by the network equipment. For example, the network equipment may preconfigure the corresponding relationship through broadcast signaling or dedicated signaling, which is not limited thereto in the embodiment of the present disclosure. In such case, the relay terminal equipment may determine a target PUCCH resource according to the data volume contained in the first bottom-layer data frame and the corresponding relationship between the PUCCH resource and the preset data volume or the preset data volume range and adopt the target PUCCH resource to send a scheduling request to the network equipment. However, the embodiment of the present disclosure is not limited thereto.

At this moment, after receiving the scheduling request, the network equipment may determine a data volume or data volume range corresponding to the scheduling request according to the PUCCH resource occupied by the scheduling request and allocate the uplink transmission resource according to the data volume or data volume range. However, the embodiment of the present disclosure is not limited thereto.

As another optional embodiment, the relay terminal equipment sends a preamble to the network equipment to initiate the uplink grant request. Optionally, a corresponding relationship may exist between a preamble and a preset data volume or a preset data volume range. Here, the corresponding relationship may be predefined or preconfigured by the network equipment. For example, the network equipment may preconfigure the corresponding relationship through broadcast signaling or dedicated signaling, which is not limited thereto in the embodiment of the present disclosure. In such case, the relay terminal equipment may determine a target preamble according to the data volume contained in the first bottom-layer data frame and the corresponding relationship between the preamble and the preset data volume or the preset data volume range and send the target preamble to the network equipment. However, the embodiment of the present disclosure is not limited thereto.

At this moment, after receiving the preamble, the network equipment may determine a data volume or data volume range corresponding to the preamble and allocate the uplink transmission resource according to the data volume or data volume range. However, the embodiment of the present disclosure is not limited thereto.

Optionally, the relay terminal equipment may further initiate the uplink grant request in another manner, which is not limited thereto in the embodiment of the present disclosure.

In S260, when receiving the first bottom-layer data frame or second bottom-layer data frame sent by the relay terminal equipment, the receiver equipment may determine the remote terminal equipment corresponding to the first bottom-layer data frame or the second bottom-layer data frame in the higher layer according to the identification information, contained in the first bottom-layer data frame or the second bottom-layer data frame, of the remote terminal equipment.

Optionally, the remote terminal equipment receiving the first bottom-layer data frame or second bottom-layer data frame sent by the relay terminal equipment may identify the identification information, contained in the data frame, of the remote terminal equipment in the higher layer (for example, L2) to determine whether the data frame is sent to the remote terminal equipment. When it is determined that the data frame is sent to the remote terminal equipment, the remote terminal equipment may perform decoding processing on the data frame. When it is determined that the data frame is not sent to the remote terminal equipment, the remote terminal equipment may discard the data frame. However, there are no limits made in the embodiment of the present disclosure.

Optionally, when receiving the first bottom-layer data frame or second bottom-layer data frame sent by the relay terminal equipment, the receiver equipment may identify the identification information, contained in the data frame, of the remote terminal equipment in the higher layer (for example, L2) to determine the remote terminal equipment corresponding to the data frame and send the data contained in the data frame to a core network equipment according to the corresponding remote terminal equipment. For example, if a data transmission channel (for example, a General Packet Radio Service (GPRS) Tunneling Protocol (GTP) tunnel) of the remote terminal equipment is established between the network equipment and the core network equipment (for example, a P-GW), the network equipment may send the data contained in the data frame to the core network equipment through the data transmission channel corresponding to the remote terminal equipment. However, the embodiment of the present disclosure is not limited thereto.

Optionally, before relay transmission, the network equipment may further establish a bearer for the remote terminal equipment. For example, the data transmission channel (for example, the GTP tunnel) of the remote terminal equipment may be established between the network equipment and the P-GW and a radio bearer of the remote terminal equipment may be established between the network equipment and the relay terminal equipment. However, the embodiment of the present disclosure is not limited thereto.

Optionally, the relay terminal equipment may receive a connection establishment request of the remote terminal equipment, the connection establishment request being configured to request for establishment of a D2D communication link between the relay terminal equipment and the remote terminal equipment. Optionally, the connection establishment request may specifically be a direct communication request configured to request for establishment of a PC5 connection with the relay terminal equipment.

The relay terminal equipment may send a bearer establishment request to the core network equipment according to the connection establishment request, and the bearer establishment request may contain the terminal equipment identifier of the remote terminal equipment. Optionally, the core network equipment may be an MME, and the MME may send the terminal equipment identifier, contained in the bearer establishment request, of the remote terminal equipment to the P-GW to enable the P-GW to establish the data transmission channel (for example, the GTP tunnel) of the remote terminal equipment with the network equipment and enable the network equipment to establish the radio bearer of the remote terminal equipment. Here, the radio bearer may include a cellular data transmission channel between the network equipment and the relay terminal equipment and a D2D data transmission channel between the relay terminal equipment and the remote terminal equipment.

The relay terminal equipment may receive a bearer establishment response sent by the network equipment, the bearer establishment response containing configuration information of the radio bearer established for the remote terminal equipment by the network equipment. Here, the configuration information of the radio bearer may optionally include PHY-layer configuration information. Optionally, the configuration information of the radio bearer may further include at least one of the following information: MAC-layer configuration information, PDCP-layer configuration information and RLC-layer configuration information. Optionally, the configuration information of the radio bearer may further include the L2 identifier allocated to the remote terminal equipment by the network equipment. However, the embodiment of the present disclosure is not limited thereto.

Optionally, the relay terminal equipment may send a connection establishment response to the remote terminal equipment according to the bearer establishment response. The connection establishment response contains the PHY-layer configuration information, or may further contain at least one of the MAC-layer configuration information, the PDCP-layer configuration information and the RLC-layer configuration information, and may further contain the L2 identifier of the remote terminal equipment. However, the embodiment of the present disclosure is not limited thereto.

Optionally, before relay transmission, the network equipment may also establish the bearer for the remote terminal equipment. For example, the data transmission channel (for example, the GTP tunnel) of the remote terminal equipment may be established between the network equipment and the P-GW and the radio bearer of the remote terminal equipment may be established between the network equipment and the relay terminal equipment. However, the embodiment of the present disclosure is not limited thereto.

Optionally, the relay terminal equipment may receive the connection establishment request of the remote terminal equipment, the connection establishment request being configured to request for establishment of the D2D communication link between the relay terminal equipment and the remote terminal equipment. Optionally, the connection establishment request may specifically be a direct communication request configured to request for establishment of the PC5 connection with the relay terminal equipment.

The relay terminal equipment may send the bearer establishment request to the core network equipment according to the connection establishment request, and the bearer establishment request may contain the terminal equipment identifier of the remote terminal equipment. Optionally, the core network equipment may be an MME, and the MME may send the terminal equipment identifier, contained in the bearer establishment request, of the remote terminal equipment to the P-GW to enable the P-GW to establish the data transmission channel (for example, the GTP tunnel) of the remote terminal equipment with the network equipment and enable the network equipment to establish the radio bearer of the remote terminal equipment. Here, the radio bearer may include the cellular data transmission channel between the network equipment and the relay terminal equipment and the D2D data transmission channel between the relay terminal equipment and the remote terminal equipment.

The relay terminal equipment may receive the bearer establishment response sent by the network equipment, the bearer establishment response containing the configuration information of the radio bearer established for the remote terminal equipment by the network equipment. Here, the configuration information of the radio bearer may optionally include the PHY-layer configuration information. Here, the PHY-layer configuration information may optionally include a relay-specific RNTI and/or a PHY resource configured for relay transmission. Here, the PHY resource configured for relay transmission may include a PHY resource configured for relay transmission between the relay terminal equipment and the network equipment and/or a PHY source configured for relay transmission between the relay terminal equipment and the remote terminal equipment. Optionally, the PHY-layer configuration information may further include indication information configured to indicate the corresponding relationship between the preamble and the data volume range and/or indication information configured to indicate the corresponding relationship between the PUCCH resource and the data volume range. However, the embodiment of the present disclosure is not limited thereto.

Optionally, the configuration information of the radio bearer may further include L2 configuration information, and the L2 configuration information may include at least one of the MAC-layer configuration information, the RLC-layer configuration information and the PDCP-layer configuration information. Optionally, the L2 configuration may include the L2 identifier allocated to the remote terminal equipment by the network equipment. However, the embodiment of the present disclosure is not limited thereto.

Optionally, the relay terminal equipment may send the connection establishment response to the remote terminal equipment according to the bearer establishment response. The connection establishment response contains at least one of the MAC-layer configuration information, the RLC-layer configuration information and the PDCP-layer configuration information. Optionally, if the connection establishment response does not contain the L2 configuration information, the remote terminal equipment may configure L2 according to a received D2D broadcast message of the relay terminal equipment. Optionally, if the connection establishment response contains the L2 configuration information, the remote terminal equipment may configure L2 according to at least one of the MAC-layer configuration information, the RLC-layer configuration information and the PDCP-layer configuration information contained in the connection establishment response. However, the embodiment of the present disclosure is not limited thereto.

Therefore, according to the relay transmission method of the embodiment of the present disclosure, the relay terminal equipment relays the data between the remote terminal equipment and the network equipment in the bottom-layer relay manner. Here, the remote terminal equipment or the network equipment sends the bottom-layer data frame to the relay terminal equipment. The relay terminal equipment does not identify the remote terminal equipment in the bottom layer. When it is determined that the received data frame contains relay data, the relay terminal equipment performs relay forwarding processing on the data frame through the bottom layer. Compared with an L3 relay manner adopted by the relay terminal equipment in the conventional art, such a manner may reduce processing complexity of the relay terminal equipment, reduce a transmission delay of the relay data and improve overall system performance.

The embodiment of the present disclosure will be described below in conjunction with specific examples in detail. It is to be noted that these examples are adopted not to limit the scope of the embodiment of the present disclosure but only to help those skilled in the art to better understand the embodiment of the present disclosure.

For convenient description, in the following examples, there is made such a hypothesis that a cellular network has established a Packet Data Network (PDN) connection and a bearer for remote terminal equipment and such a hypothesis that the remote terminal equipment is specifically remote UE, relay terminal equipment is specifically relay UE, network equipment is specifically an eNB and a bottom layer corresponding to a PC5 is specifically a PHY layer. It is to be understood that, it another D2D communication technology different from an SL technology of LTE is adopted for the PC5 interface, the bottom layer may specifically be L1 corresponding to the other D2D communication technology. However, the embodiment of the present disclosure is not limited thereto.

Figure 5:
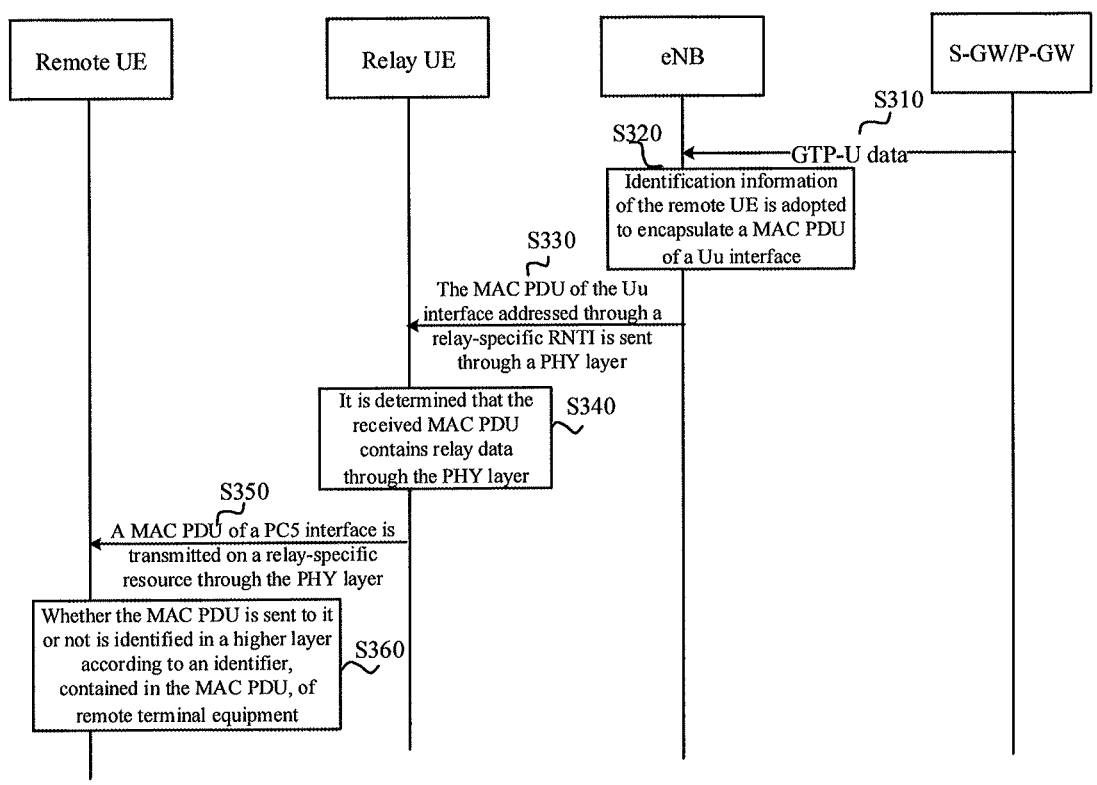
FIG. 5 is a schematic flowchart of another relay transmission method according to an embodiment of the present disclosure.

FIG. 5 schematically shows a relay transmission method 300 according to another embodiment of the present disclosure. The method 300 may be applied to relay transmission of downlink data.

In S310, when receiving data sent by the remote terminal equipment, a P-GW sends the data to an eNB through a GTP tunnel of an S1-U interface allocated in a bearer establishment process.

In S320, after receiving the data of the remote terminal equipment from the GTP tunnel, the eNB encapsulates the data into a MAC PDU of a Uu interface. Here, the MAC PDU of the Uu interface contains identification information of the remote terminal equipment, for example, an L2 identifier or a terminal equipment identifier.

In S330, the eNB may schedule downlink data transmission through a PDCCH addressed by a relay-specific RNTI and transmit the MAC PDU of the Uu interface to relay terminal equipment in a Physical Downlink Shared Channel (PDSCH) through the PHY layer.

At this moment, the eNB may optionally scramble the PDCCH through the relay-specific RNTI to indicate that the PDCCH is configured to schedule relay data transmission. Correspondingly, the relay terminal equipment may perform addressing according to the relay-specific RNTI. However, the embodiment of the present disclosure is not limited thereto.

In S340, after receiving the MAC PDU of the Uu interface through the PHY layer, the relay terminal equipment may determine that the received MAC PDU contains relay data in the PHY layer and send a MAC PDU of the PC5 interface through the PHY layer.

At this moment, the relay terminal equipment may not identify the remote terminal equipment corresponding to the received MAC PDU. Optionally, the relay terminal equipment may not perform decoding processing on the received MAC PDU, and at this moment, the MAC PDU of the Uu interface may be the same as the MAC PDU of the PC5 interface. Alternatively, the relay terminal equipment may perform decoding and coding processing on the received MAC PDU of the Uu interface in the PHY layer to obtain the MAC PDU of the PC5 interface. However, the embodiment of the present disclosure is not limited thereto.

In S350, the relay terminal equipment sends the MAC PDU of the PC5 interface on a specific time-frequency resource configured for relay transmission.

Wherein, the relay terminal equipment may broadcast the MAC PDU of the PC5 interface on a time-frequency resource configured for relay transmission.

In S360, after receiving the MAC PDU of the PC5 interface through the PHY layer, the remote terminal equipment may perform parsing processing on the identification information, contained in the MAC PDU of the PC5 interface, of the remote terminal equipment in a higher layer (for example, L2) to determine whether the MAC PDU is sent to it or not. Optionally, if determining that the received MAC PDU is sent to it, the remote terminal equipment may perform further processing such as decoding on the MAC PDU. If determining that the received MAC PDU is not sent to it, the remote terminal equipment may discard the MAC PDU. However, the embodiment of the invention is not limited thereto.

Figure 6:
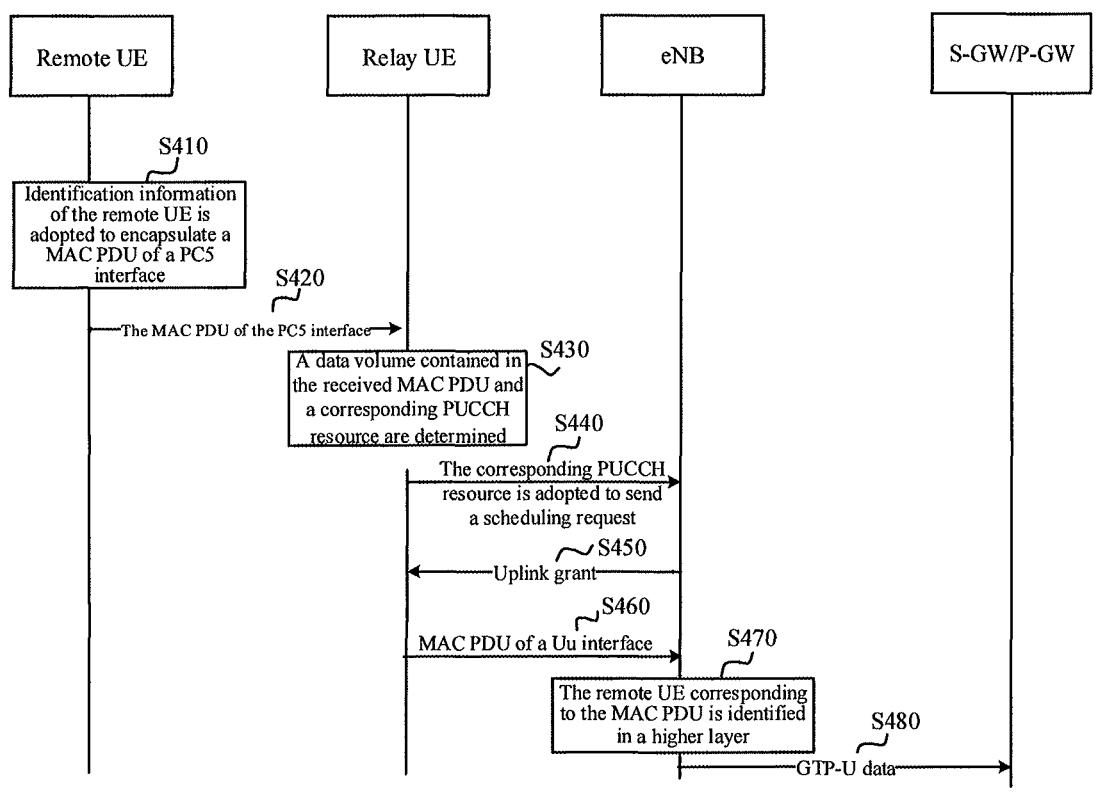
FIG. 6 is a schematic flowchart of another relay transmission method according to an embodiment of the present disclosure.

FIG. 6 schematically shows a relay transmission method 400 according to another embodiment of the present disclosure. The method 400 may be applied to relay transmission of uplink data.

In S410, when remote terminal equipment has data to be sent to a cellular network, the remote terminal equipment encapsulates the data into a MAC PDU. Here, the MAC PDU contains identification information of the remote terminal equipment.

In S420, the remote terminal equipment sends the MAC PDU on a time-frequency resource configured for relay transmission in a PHY layer through a PC5 interface.

In S430, after receiving the MAC PDU from the remote terminal equipment through the PHY layer, relay terminal equipment may perform decoding processing on the received MAC PDU in the PHY layer to determine a data volume contained in the MAC PDU.

At this moment, the relay terminal equipment may not identify the remote terminal equipment corresponding to the received MAC PDU but only identify the data volume contained in the MAC PDU in the PHY layer.

Optionally, in S440, the relay terminal equipment determines a PUCCH resource corresponding to the data volume contained in the MAC PDU according to a corresponding relationship between a preset data volume range and a PUCCH resource and adopt the PUCCH resource to send a scheduling request to an eNB.

In S450, after receiving the scheduling request sent by the relay terminal equipment, the eNB may determine a data volume range to be sent by the relay terminal equipment according to the PUCCH resource occupied by the scheduling request and allocate an uplink transmission resource to the relay terminal equipment through a PDCCH according to the data volume range.

In S460, after receiving the PDCCH sent by the eNB, the relay terminal equipment may send a MAC PDU of a Uu interface on the uplink transmission resource allocated by the eNB through the PHY layer.

In S470, after receiving the MAC PDU sent by the relay terminal equipment through the PHY layer, the eNB may parse the MAC PDU of the Uu interface in a higher layer (for example, L2) to identify the remote terminal equipment corresponding to the MAC PDU.

In S480, the eNB may transmit the data contained in the MAC PDU to a P-GW in a GTP tunnel corresponding to the remote terminal equipment through an S1 interface.

It is important to note that the examples of FIG. 5 and FIG. 6 are adopted not to limit the scope of the embodiment of the present disclosure but to help those skilled in the art to better understand the embodiment of the present disclosure. Those skilled in the art may obviously make various equivalent modifications or variations according to the listed examples of FIG. 5 and FIG. 6, and these modifications and variations also fall within the scope of the embodiment of the present disclosure.

It is to be understood that magnitudes of sequence numbers of each process do not mean an execution sequence and the execution sequence of each process should be determined by their functions and an internal logic and should not form any limit to an implementation process of the embodiment of the present disclosure.

The relay transmission method according to the embodiment of the present disclosure is described above in combination with FIG. 1 to FIG. 6 in detail, and a device for relay transmission according to the embodiment of the present disclosure will be described below in combination with FIG. 7 to FIG. 12 in detail.

Figure 7:
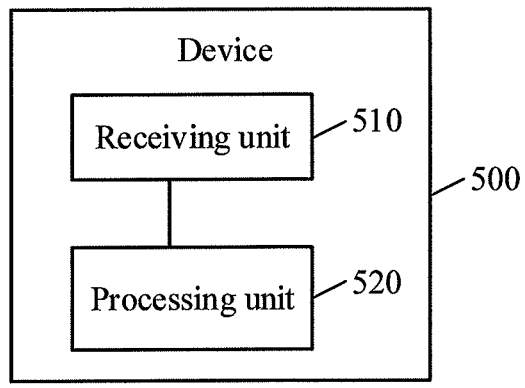
FIG. 7 is a schematic block diagram of a device for relay transmission according to an embodiment of the present disclosure.

FIG. 7 schematically shows a device for relay transmission 500 according to an embodiment of the present disclosure. The device 500 includes a receiving unit 510 and a processing unit 520.

The receiving unit 510 is configured to receive a first bottom-layer data frame which is intended to be sent to a receiver equipment by a sender equipment. Here, the first bottom-layer data frame is obtained by the sender equipment by processing through a bottom layer, a MAC PDU containing identification information of a remote terminal equipment.

The processing unit 520 is configured to determine that the first bottom-layer data frame received by the receiving unit 510 is required to be forwarded in the bottom layer and perform forwarding processing on the first bottom-layer data frame in the bottom layer.

Here, the sender equipment is the remote terminal equipment and the receiver equipment is a network equipment, or the sender equipment is the network equipment and the receiver equipment is the remote terminal equipment.

Optionally, when the sender equipment is the network equipment, the processing unit 520 is further configured to, before the receiving unit 510 receives the first bottom-layer data frame which is intended to be sent to the receiver equipment by the sender equipment, perform addressing through a relay-specific RNTI. In such case, the processing unit 520 is specifically configured to, if the first bottom-layer data frame is received by relay terminal equipment by addressing, determine, by the relay terminal equipment, that the first bottom-layer data frame is required to be forwarded.

Optionally, the first bottom-layer data frame is sent by the sender equipment by adopting a transmission resource for relay transmission. In such case, the processing unit 520 is specifically configured to determine that the first bottom-layer data frame is required to be forwarded according to the transmission resource occupied by the first bottom-layer data frame.

Optionally, the identification information of the remote terminal equipment includes an L2 identifier of the remote terminal equipment or a terminal equipment identifier of the remote terminal equipment.

Optionally, a bottom layer of the network equipment is specifically a PHY layer, and a bottom layer of the remote terminal equipment corresponds to a D2D communication technology adopted between the remote terminal equipment and the relay terminal equipment.

Optionally, the identification information of the remote terminal equipment is born in a MAC CE field of the MAC PDU.

Optionally, when the sender equipment is the remote terminal equipment and the receiver equipment is the network equipment, the processing unit 520 is further configured to, before performing forwarding processing on the first bottom-layer data frame in the bottom layer, determine a PUCCH resource corresponding to a data volume contained in the first bottom-layer data frame in the bottom layer according to correspondences between PUCCH resources and data volumes or correspondences between PUCCH resources and data volume ranges; and correspondingly, the device 500 further includes: a first sending unit, configured to adopt the PUCCH resource determined by the processing unit 520 to send a scheduling request to the network equipment.

Optionally, when the sender equipment is the remote terminal equipment and the receiver equipment is the network equipment, the processing unit 520 is further configured to, before performing forwarding processing on the first bottom-layer data frame in the bottom layer, determine a preamble corresponding to the data volume contained in the first bottom-layer data frame in the bottom layer according to correspondences between preambles and data volumes or correspondences between preambles and data volume ranges; and correspondingly, the device 500 further includes a first sending unit, configured to send the preamble to the network equipment, the preamble being configured for the network equipment to allocate an uplink transmission resource to the relay terminal equipment.

Optionally, the processing unit 520 is specifically configured to perform decoding processing on the first bottom-layer data frame to obtain data contained in the first bottom-layer data frame and perform coding processing on the data to obtain a second bottom-layer data frame; and correspondingly, the device 500 further includes: a second sending unit, configured to send the second bottom-layer data frame obtained by the processing unit 520.

Optionally, the device 500 further includes a second sending unit. Here, the processing unit 520 is specifically configured to directly send the first bottom-layer data frame through the second sending unit in the bottom layer.

In an optional example, the device 500 may specifically be the relay terminal equipment in the abovementioned embodiment, and the device 500 may be configured to execute each flow and/or step corresponding to the relay terminal equipment in the abovementioned method embodiment and will not be elaborated herein to avoid repetitions.

Figure 8:
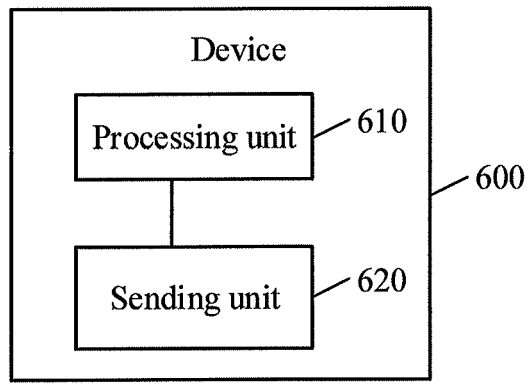
FIG. 8 is a schematic block diagram of another device for relay transmission according to an embodiment of the present disclosure.

FIG. 8 schematically shows another device 600 for relay transmission according to an embodiment of the present disclosure. Here, the device 600 may specifically be remote terminal equipment or sender equipment is network equipment. As shown in FIG. 8, the device 600 includes a processing unit 610 and a sending unit 620.

The processing unit 610 is configured to generate a MAC PDU. Here, the MAC PDU contains identification information of a remote terminal equipment.

The sending unit 620 is configured to send a first bottom-layer data frame, which is obtained by processing the MAC PDU through a bottom layer, to a relay terminal equipment.

Optionally, if the device 600 is the network equipment, the sending unit 620 is further configured to, before sending the first bottom-layer data frame to the relay terminal equipment, send a PDCCH to the relay terminal equipment. Here, the PDCCH is configured to schedule the first bottom-layer data frame, and the PDCCH is scrambled by adopting a relay-specific RNTI.

Optionally, the sending unit 620 is specifically configured to adopt a transmission resource for relay transmission to send the first bottom-layer data frame to the relay terminal equipment.

Optionally, the identification information of the remote terminal equipment includes an L2 identifier of the remote terminal equipment or a terminal equipment identifier of the remote terminal equipment.

Optionally, the identification information of the remote terminal equipment is born in a MAC CE field of the MAC PDU.

In an optional example, the device 600 may specifically be the sender equipment in the abovementioned embodiment, and the device 600 may be configured to execute each flow and/or step corresponding to the sender equipment in the abovementioned method embodiment and will not be elaborated herein to avoid repetitions.

Figure 9:
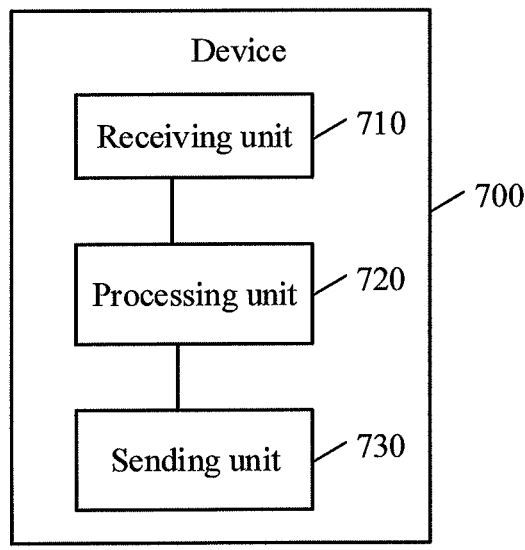
FIG. 9 is a schematic block diagram of another device for relay transmission according to an embodiment of the present disclosure.

FIG. 9 shows another device 700 for relay transmission according to an embodiment of the present disclosure. Here, the device 700 may specifically be network equipment or receiver equipment is remote terminal equipment. As shown in FIG. 9, the device 700 includes a receiving unit 710 and a processing unit 720.

The receiving unit 710 is configured to receive a second bottom-layer data frame sent by a relay terminal equipment. Here, the second bottom-layer data frame is obtained by processing a MACPDU containing identification information of a remote terminal equipment through a bottom layer.

The processing unit 720 is configured to determine that the second bottom-layer data frame corresponds to the remote terminal equipment in a higher layer according to the identification information of the remote terminal equipment contained in the second bottom-layer data frame received by the receiving unit 710.

Optionally, the receiving unit 710 is specifically configured to receive the second bottom-layer data frame sent by the relay terminal equipment by adopting a transmission resource for relay transmission.

Correspondingly, the processing unit 720 is specifically configured to determine that the second bottom-layer data frame has been forwarded by the relay terminal equipment according to the transmission resource occupied by the second bottom-layer data frame.

Optionally, if the device 700 is the network equipment, the processing unit 720 is further configured to determine a data transmission tunnel corresponding to the remote terminal equipment. In such case, as shown in FIG. 9, the device 700 further includes a sending unit 730, configured to send data contained in the second bottom-layer data frame to a core network equipment through the corresponding data transmission tunnel determined by the processing unit 720.

Optionally, the identification information of the remote terminal equipment includes an L2 identifier of the remote terminal equipment or a terminal equipment identifier of the remote terminal equipment.

Optionally, the identification information of the remote terminal equipment is born in a MAC CE field of the MAC PDU.

Optionally, if the device 700 is the network equipment, the receiving unit 710 is further configured to, before receiving the second bottom-layer data frame sent by the relay terminal equipment, receive a scheduling request sent by the relay terminal equipment.

Correspondingly, the processing unit 720 is further configured to determine a data volume or data volume range corresponding to a PUCCH resource occupied by the scheduling request received by the receiving unit 710 according to correspondences between PUCCH resources and data volumes or correspondences between PUCCH resources and data volume ranges and allocate an uplink transmission resource to the relay terminal equipment according to the data volume or data volume range.

Optionally, if the device 700 is the network equipment, the receiving unit 710 is further configured to, before receiving the second bottom-layer data frame sent by the relay terminal equipment, receive a preamble sent by the relay terminal equipment.

Correspondingly, the processing unit 720 is further configured to determine a data volume or data volume range corresponding to the preamble received by the receiving unit 710 according to correspondences between preambles and data volumes or correspondences between preambles and data volume ranges and allocate the uplink transmission resource to the relay terminal equipment according to the data volume or data volume range.

In an optional example, the device 700 may specifically be the receiver equipment in the abovementioned embodiment, and the device 700 may be configured to execute each flow and/or step corresponding to the receiver equipment in the abovementioned method embodiment and will not be elaborated herein to avoid repetitions.

It is to be understood that each of the device 500, the device 600 and the device 700 is implemented in form of functional unit. Term "unit" mentioned herein may refer to an Application Specific Integrated Circuit (ASIC), an electronic circuit, a processor (for example, a shared processor, a dedicated processor or a group processor) and memory configured to execute one or more software or firmware programs, a combined logical circuit and/or another proper component supporting the described functions.

Figure 10:
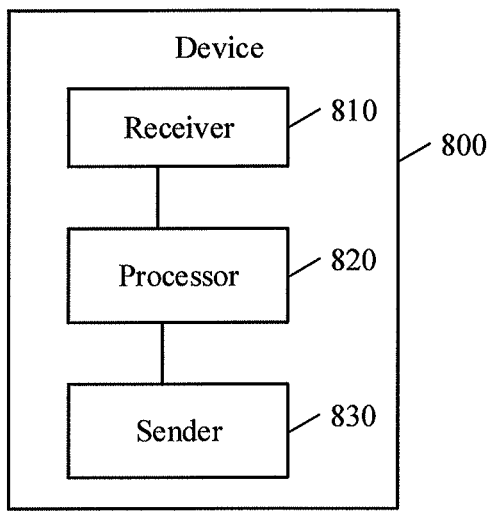
FIG. 10 is a schematic block diagram of another device for relay transmission according to an embodiment of the present disclosure.

FIG. 10 schematically shows a device 800 for relay transmission according to an embodiment of the present disclosure. The device 800 includes a receiver 810 and a processor 820.

The receiver 810 is configured to receive a first bottom-layer data frame which is intended to be sent to a receiver equipment by a sender equipment. Here, the first bottom-layer data frame is obtained by the sender equipment by processing through a bottom layer, a MAC PDU containing identification information of a remote terminal equipment.

The processor 820 is configured to determine that the first bottom-layer data frame received by the receiver 810 is required to be forwarded in the bottom layer and perform forwarding processing on the first bottom-layer data frame in the bottom layer.

Here, the sender equipment is the remote terminal equipment and the receiver equipment is a network equipment, or the sender equipment is the network equipment and the receiver equipment is the remote terminal equipment.

Optionally, when the sender equipment is the network equipment, the processor 820 is further configured to, before the receiver 810 receives the first bottom-layer data frame which is intended to be sent to the receiver equipment by the sender equipment, perform addressing through a relay-specific RNTI. In such case, the processor 820 is specifically configured to, if the first bottom-layer data frame is received by relay terminal equipment by addressing, determine, by the relay terminal equipment, that the first bottom-layer data frame is required to be forwarded.

Optionally, the first bottom-layer data frame is sent by the sender equipment by adopting a transmission resource for relay transmission. In such case, the processor 820 is specifically configured to determine that the first bottom-layer data frame is required to be forwarded according to the transmission resource occupied by the first bottom-layer data frame.

Optionally, the identification information of the remote terminal equipment includes an L2 identifier of the remote terminal equipment or a terminal equipment identifier of the remote terminal equipment.

Optionally, a bottom layer of the network equipment is specifically a PHY layer, and a bottom layer of the remote terminal equipment corresponds to a D2D communication technology adopted between the remote terminal equipment and the relay terminal equipment.

Optionally, the identification information of the remote terminal equipment is born in a MAC CE field of the MAC PDU.

Optionally, when the sender equipment is the remote terminal equipment and the receiver equipment is the network equipment, the processor 820 is further configured to, before performing forwarding processing on the first bottom-layer data frame in the bottom layer, determine a PUCCH resource corresponding to a data volume contained in the first bottom-layer data frame in the bottom layer according to correspondences between PUCCH resources and data volumes or correspondences between PUCCH resources and data volume ranges. Correspondingly, the device 800 further includes a sender 830, configured to adopt the PUCCH resource determined by the processor 820 to send a scheduling request to the network equipment.

Optionally, when the sender equipment is the remote terminal equipment and the receiver equipment is the network equipment, the processor 820 is further configured to, before performing forwarding processing on the first bottom-layer data frame in the bottom layer, determine a preamble corresponding to the data volume contained in the first bottom-layer data frame in the bottom layer according to correspondences between preambles and data volumes or correspondences between preambles and data volume ranges; and correspondingly, the device 800 further includes a sender 830, configured to send the preamble to the network equipment, the preamble being configured for the network equipment to allocate an uplink transmission resource to the relay terminal equipment.

Optionally, the processor 820 is specifically configured to perform decoding processing on the first bottom-layer data frame to obtain data contained in the first bottom-layer data frame and perform coding processing on the data to obtain a second bottom-layer data frame. Correspondingly, the device 800 further includes: a sender 830, configured to send the second bottom-layer data frame obtained by the processor 820.

Optionally, the device 800 further includes a sender 830. Here, the processor 820 is specifically configured to directly send the first bottom-layer data frame through the sender 830 in the bottom layer.

In an optional example, the device 800 may specifically be the relay terminal equipment in the abovementioned embodiment. And the device 800 may be configured to execute each step and/or flow corresponding to the relay terminal equipment in the abovementioned method embodiment. Optionally, the device 800 may further include a memory, and the memory may include a Read-Only Memory (ROM) and a Random Access Memory (RAM), and provides an instruction and data for the processor. A part of the memory may further include a nonvolatile RAM. For example, the memory may further store information about an equipment type. The processor may be configured to execute the instruction stored in the memory, and when the processor executes the instruction stored in the memory, the processor is configured to execute each step and/or flow of the abovementioned method embodiment.

Figure 11:
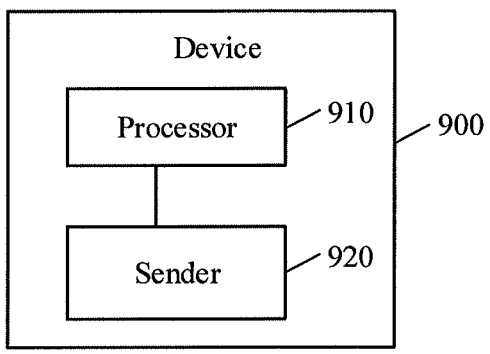
FIG. 11 is a schematic block diagram of another device for relay transmission according to an embodiment of the present disclosure.

FIG. 11 schematically shows another device 900 for relay transmission according to an embodiment of the present disclosure. Here, the device 900 may specifically be remote terminal equipment or sender equipment is network equipment. As shown in FIG. 11, the device 900 includes a processor 910 and a sender 920.

The processor 910 is configured to generate a MAC PDU. Here, the MAC PDU contains identification information of a remote terminal equipment.

The sender 920 is configured to send a first bottom-layer data frame, which is obtained by processing the MAC PDU through a bottom layer, to a relay terminal equipment.

Optionally, if the device 900 is the network equipment, the sender 920 is further configured to, before sending the first bottom-layer data frame to the relay terminal equipment, send a PDCCH to the relay terminal equipment. Here, the PDCCH is configured to schedule the first bottom-layer data frame, and the PDCCH is scrambled by adopting a relay-specific RNTI.

Optionally, the sender 920 is specifically configured to adopt a transmission resource for relay transmission to send the first bottom-layer data frame to the relay terminal equipment.

Optionally, the identification information of the remote terminal equipment includes an L2 identifier of the remote terminal equipment or a terminal equipment identifier of the remote terminal equipment.

Optionally, the identification information of the remote terminal equipment is born in a MAC CE field of the MAC PDU.

In an optional example, the device 900 may specifically be the sender equipment in the abovementioned embodiment, and the device 900 may be configured to execute each step and/or flow corresponding to the sender equipment in the abovementioned method embodiment. Optionally, the device 900 may further include a memory, and the memory may include a ROM and a RAM, and provides an instruction and data for the processor. A part of the memory may further include a nonvolatile RAM. For example, the memory may further store information about an equipment type. The processor may be configured to execute the instruction stored in the memory, and when the processor executes the instruction stored in the memory, the processor is configured to execute each step and/or flow of the abovementioned method embodiment.

Figure 12:
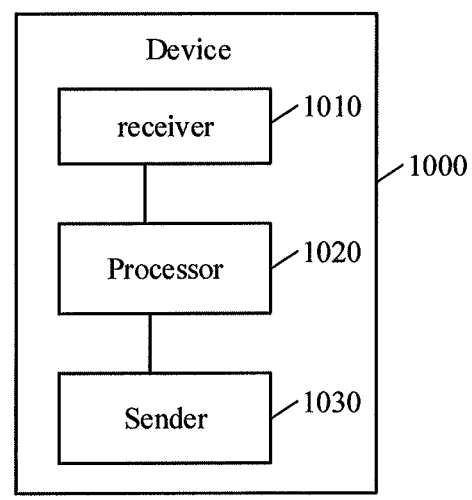
FIG. 12 is a schematic block diagram of another device for relay transmission according to an embodiment of the present disclosure.

FIG. 12 shows another device 1000 for relay transmission according to an embodiment of the present disclosure. Here, the device 1000 may specifically be network equipment or receiver equipment is remote terminal equipment. As shown in FIG. 12, the device 1000 includes a receiver 1010 and a processor 1020.

The receiver 1010 is configured to receive a second bottom-layer data frame sent by a relay terminal equipment.

Here, the second bottom-layer data frame is obtained by processing a MAC PDU containing identification information of a remote terminal equipment through a bottom layer.

The processor 1020 is configured to determine that the second bottom-layer data frame corresponds to the remote terminal equipment in a higher layer according to the identification information of the remote terminal equipment contained in the second bottom-layer data frame received by the receiver 1010.

Optionally, the receiver 1010 is specifically configured to receive the second bottom-layer data frame sent by the relay terminal equipment by adopting a transmission resource for relay transmission.

Correspondingly, the processor 1020 is specifically configured to determine that the second bottom-layer data frame has been forwarded by the relay terminal equipment according to the transmission resource occupied by the second bottom-layer data frame.

Optionally, if the device 1000 is the network equipment, the processor 1020 is further configured to determine a data transmission tunnel corresponding to the remote terminal equipment. In such case, as shown in FIG. 12, the device 1000 further includes a sender 1030, configured to send data contained in the second bottom-layer data frame to a core network equipment through the corresponding data transmission tunnel determined by the processor 1020.

Optionally, the identification information of the remote terminal equipment includes an L2 identifier of the remote terminal equipment or a terminal equipment identifier of the remote terminal equipment.

Optionally, the identification information of the remote terminal equipment is born in a MAC CE field of the MAC PDU.

Optionally, if the device 1000 is the network equipment, the receiver 1010 is further configured to, before receiving the second bottom-layer data frame sent by the relay terminal equipment, receive a scheduling request sent by the relay terminal equipment; and correspondingly, the processor 1020 is further configured to determine a data volume or data volume range corresponding to a PUCCH resource occupied by the scheduling request received by the receiver 1010 according to correspondences between PUCCH resources and data volumes or correspondences between PUCCH resources and data volume ranges and allocate an uplink transmission resource to the relay terminal equipment according to the data volume or data volume range.

Optionally, if the device 1000 is the network equipment, the receiver 1010 is further configured to, before receiving the second bottom-layer data frame sent by the relay terminal equipment, receive a preamble sent by the relay terminal equipment.

Correspondingly, the processor 1020 is further configured to determine a data volume or data volume range corresponding to the preamble received by the receiver 1010 according to correspondences between preambles and data volumes or correspondences between preambles and data volume ranges and allocate the uplink transmission resource to the relay terminal equipment according to the data volume or data volume range.

In an optional example, the device 1000 may specifically be the receiver equipment in the abovementioned embodiment, and the device 1000 may be configured to execute each step and/or flow corresponding to the receiver equipment in the abovementioned method embodiment. Optionally, the device 1000 may further include a memory, and the memory may include a ROM and a RAM, and provides an instruction and data for the processor. A part of the memory may further include a nonvolatile RAM. For example, the memory may further store information about an equipment type. The processor may be configured to execute the instruction stored in the memory, and when the processor executes the instruction stored in the memory, the processor is configured to execute each step and/or flow of the abovementioned method embodiment.

It is to be understood that, in the embodiment of the present disclosure, the processor may be a Central Processing Unit (CPU), and the processor may also be another universal processor, a Digital Signal Processor (DSP), an ASIC, a Field Programmable Gate Array (FPGA) or another programmable logical device, a discrete or transistor logical device, a discrete hardware component and the like. The universal processor may be a microprocessor or the processor may also be any conventional processor and the like.

In an implementation process, each step of the method may be completed through an integrated logical circuit of hardware in the processor or an instruction in a software form. The steps of the method disclosed in combination with the embodiments of the present disclosure may directly be embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory, and the processor executes the instruction in the memory to complete the steps of the method in combination with hardware. For avoiding repetitions, no more detailed descriptions will be made herein.

It is to be understood that, for avoiding repetitions, descriptions about the embodiments of the present disclosure emphasize differences between each embodiment and the same or similar parts may refer to each other.

Those of ordinary skilled in the art may realize that the steps and units of each method described in combination with the embodiments disclosed in the present disclosure may be implemented by electronic hardware, computer software or a combination of the two. For clearly describing interchangeability of hardware and software, the steps and compositions of each embodiment have been generally described according to functions in the above descriptions. Whether these functions are executed in a hardware or software manner depends on specific applications and design constraints of the technical solutions. Those of ordinary skilled in the art may realize the described functions for each specific application by virtue of different methods, but such realization shall fall within the scope of the present disclosure.

Those skilled in the art may clearly learn about that specific working processes of the system, device and unit described above may refer to the corresponding processes in the method embodiments and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments of the present disclosure according to a practical requirement.

In addition, each function unit in each embodiment of the present disclosure may be integrated into a processing unit, each unit may also physically exist independently, and two or more than two units may also be integrated into a unit. The integrated unit may be implemented in a hardware form and may also be implemented in form of software functional unit When being implemented in form of software functional unit and sold or used as an independent product, the integrated unit may be stored in a computer-readable storage medium. Based on such an understanding, the technical solutions of the present disclosure substantially or parts making contributions to the conventional art or part of the technical solutions may be embodied in form of software product, and the computer software product is stored in a storage medium, including a plurality of instructions configured to enable a computer equipment (which may be a personal computer, a server, network equipment or the like) to execute all or part of the steps of the method in each embodiment of the present disclosure. The storage medium includes: various media capable of storing program codes such as a U disk, a mobile hard disk, a ROM, a RAM, a magnetic disk or an optical disk.

The above is only the specific implementation mode of the present disclosure and not intended to limit the scope of protection of the present disclosure. Various equivalent modifications or replacements are apparent to those skilled in the art within the technical scope disclosed by the present disclosure, and these modifications or replacements shall fall within the scope of protection of the present disclosure. Therefore, the scope of protection of the present disclosure shall be subject to the scope of protection of the claims.

The invention claimed is:

1. A relay transmission device, comprising:
a receive, configured to receive a first bottom-layer data frame which is intended to be sent to a receiver equipment by a sender equipment, wherein the first bottom-layer data frame is obtained by the sender equipment by processing through a bottom layer, a Media Access Control (MAC) Protocol Data Unit (PDU) containing identification information of a remote terminal equipment; and
a processor, configured to determine in the bottom layer that the first bottom-layer data frame received by the receiver is required to be forwarded and perform forwarding processing on the first bottom-layer data frame in the bottom layer,
wherein the sender equipment is the remote terminal equipment and the receiver equipment is a network equipment, or the sender equipment is the network equipment and the receiver equipment is the remote terminal equipment,
wherein when the sender equipment is the network equipment,
the processor is further configured to, before the receiver receives the first bottom-layer data frame which is intended to be sent to the receiver equipment by the sender equipment, perform addressing through a relay-specific Radio Network Temporary Identity (RNTI); and
the processor is configured to, if the first bottom-layer data frame is received by relay terminal equipment by the addressing, determine, by the relay terminal equipment, that the first bottom-layer data frame is required to be forwarded.

2. The relay transmission device of claim 1, wherein the first bottom-layer data frame is sent by the sender equipment by adopting a transmission resource for relay transmission; and
the processor is configured to determine that the first bottom-layer data frame is required to be forwarded according to the transmission resource occupied by the first bottom-layer data frame.

3. The relay transmission device of claim 1, wherein the identification information of the remote terminal equipment comprises a Layer-2 (L2) identifier of the remote terminal equipment or a terminal equipment identifier of the remote terminal equipment.

4. The relay transmission device of claim 1, wherein a bottom layer of the network equipment is a Physical (PHY) layer, and a bottom layer of the remote terminal equipment corresponds to a technology adopted for Device-to-Device (D2D) communication between the remote terminal equipment and the relay terminal equipment.

5. The relay transmission device of claim 1, wherein the identification information of the remote terminal equipment is in a MAC Control Element (CE) field of the MAC PDU.

6. The relay transmission device of claim 1, wherein when the sender equipment is the remote terminal equipment and the receiver equipment is the network equipment, the processor is further configured to, before performing forwarding processing on the first bottom-layer data frame in the bottom layer, determine a Physical Uplink Control Channel (PUCCH) resource corresponding to a data volume contained in the first bottom-layer data frame in the bottom layer according to correspondences between PUCCH resources and data volumes or correspondences between PUCCH resources and data volume ranges; and
the device further comprises: a sender, configured to adopt the PUCCH resource determined by the processor to send a scheduling request to the network equipment.

7. The relay transmission device of claim 1, wherein when the sender equipment is the remote terminal equipment and the receiver equipment is the network equipment, the processor is further configured to, before performing forwarding processing on the first bottom-layer data frame in the bottom layer, determine a preamble corresponding to the data volume contained in the first bottom-layer data frame in the bottom layer according to correspondences between preambles and data volumes or correspondences between preambles and data volume ranges; and
the device further comprises: a sender, configured to send the preamble to the network equipment, the preamble being configured for the network equipment to allocate an uplink transmission resource to the relay terminal equipment.

8. The relay transmission device of claim 1, wherein the processor is configured to perform decoding processing on the first bottom-layer data frame to obtain data contained in the first bottom-layer data frame and perform coding processing on the data to obtain a second bottom-layer data frame; and the device further comprises: a sender configured to send the second bottom-layer data frame obtained by the processor.

9. The relay transmission device of claim 1, further comprising: a sender, wherein the processor is configured to directly send the first bottom-layer data frame through the sender in the bottom layer.

10. A device for relay transmission, comprising:
a processor, configured to generate a Media Access Control (MAC) Protocol Data Unit (PDU), wherein the MAC PDU contains identification information of a remote terminal equipment; and
a sender, configured to send a first bottom-layer data frame, which is obtained by processing the MAC PDU through a bottom layer, to a relay terminal equipment,
wherein the device is the remote terminal equipment or the device is network equipment,
wherein when the device is the network equipment,
the sender is further configured to, before sending the first bottom-layer data frame to the relay terminal equipment, send a Physical Downlink Control Channel (PDCCH) to the relay terminal equipment, wherein the PDCCH is configured to schedule the first bottom-layer data frame, and the PDCCH is scrambled by adopting a relay-specific Radio Network Temporary Identity (RNTI, wherein if the first bottom-layer data frame is received by the relay terminal equipment by addressing through the RNTI, the relay terminal equipment determines that the first bottom-layer data frame is required to be forwarded.

11. The device of claim 10, wherein the sender is configured to adopt a transmission resource for relay transmission to send the first bottom-layer data frame to the relay terminal equipment.

12. The device of claim 10, wherein the identification information of the remote terminal equipment comprises a Layer-2 (L2) identifier of the remote terminal equipment or a terminal equipment identifier of the remote terminal equipment.

13. The device of claim 10, wherein the identification information of the remote terminal equipment is resides in a MAC Control Element (CE) field of the MAC PDU.

14. A device for relay transmission, comprising:
a receiver, configured to receive a second bottom-layer data frame sent by a relay terminal equipment, wherein the second bottom-layer data frame is obtained by processing a Media Access Control (MAC) Protocol Data Unit (PDU) containing identification information of a remote terminal equipment through a bottom layer; and
a processor, configured to determine in a higher layer that the second bottom-layer data frame corresponds to the remote terminal equipment according to the identification information of the remote terminal equipment contained in the second bottom-layer data frame received by the receive, wherein the device is a network equipment or the device is the remote terminal equipment,
the receiver is configured to receive the second bottom-layer data frame sent by the relay terminal equipment by adopting a transmission resource for relay transmission; and
the processor is configured to determine that the second bottom-layer data frame has been forwarded by the relay terminal equipment according to the transmission resource occupied by the second bottom-layer data frame.

15. The device of claim 14, wherein when the device is the network equipment, the processor is further configured to determine a data transmission tunnel corresponding to the remote terminal equipment; and
the device further comprises: a sender configured to send data contained in the second bottom-layer data frame to a core network equipment through the corresponding data transmission tunnel determined by the processor.

16. The device of claim 14, wherein the identification information of the remote terminal equipment comprises a Layer-2 (L2) identifier of the remote terminal equipment or a terminal equipment identifier of the remote terminal equipment.

17. The device of claim 14, wherein the identification information of the remote terminal equipment is resides in a MAC Control Element (CE) field of the MAC PDU.

18. The device of claim 14, wherein when the device is the network equipment, the receiver is further configured to, before receiving the second bottom-layer data frame sent by the relay terminal equipment, receive a scheduling request sent by the relay terminal equipment; and
the processor is further configured to determine a data volume or data volume range corresponding to a Physical Uplink Control Channel (PUCCH) resource occupied by the scheduling request received by the receiver according to correspondences between PUCCH resources and data volumes or correspondences between PUCCH resources and data volume ranges and allocate an uplink transmission resource to the relay terminal equipment according to the data volume or data volume range.

19. The device of claim 14, wherein when the device is the network equipment, the receiver is further configured to, before receiving the second bottom-layer data frame sent by the relay terminal equipment, receive a scheduling request sent by the relay terminal equipment; and
the processor is further configured to determine a data volume or data volume range corresponding to the preamble received by the receiver according to correspondences between preambles and data volumes or correspondences between preambles and data volume ranges and allocate the uplink transmission resource to the relay terminal equipment according to the data volume or data volume range.

* * * * *